United States Patent

[11] 3,627,186

| | | |
|---|---|---|
| [72] | Inventors | Ralph L. Berke<br>Park Ridge;<br>Clayton H. Clark, Mundelein, both of Ill. |
| [21] | Appl. No. | 857,977 |
| [22] | Filed | Sept. 15, 1969 |
| [45] | Patented | Dec. 14, 1971 |
| [73] | Assignee | SCM Corporation<br>New York, N.Y. |

[54] RECORD HANDLING AND RECORDING APPARATUS
7 Claims, 19 Drawing Figs.

[52] U.S. Cl.................................................. 226/100, 226/11
[51] Int. Cl.......................................................... B65h 25/30
[50] Field of Search........................................... 226/100, 11; 340/259

[56] References Cited
UNITED STATES PATENTS
3,123,267  3/1964  Dodsworth................  226/11

Primary Examiner—Allen N. Knowles
Attorney—Mason, Kolehmainen, Rathburn & Wyss

ABSTRACT: There is disclosed a recorder together with verification, tape-motion, slack-tape, and out-of-tape alarms. In particular, the incoming signal is temporarily mechanically stored in the recorder by selectively positioning mechanical elements in either one of two positions. A signal is generated in response to the position of these elements and is verified by comparing the generated signal with the incoming signal. A lack of comparison results in an alarm condition. An alarm condition also exists when the tape-feeding mechanism operates without feeding the record medium, when the tape becomes too slack indicating either that the tape is not being taken up or that the tape has left its predetermined path of movement, or when the tape supply is exhausted.

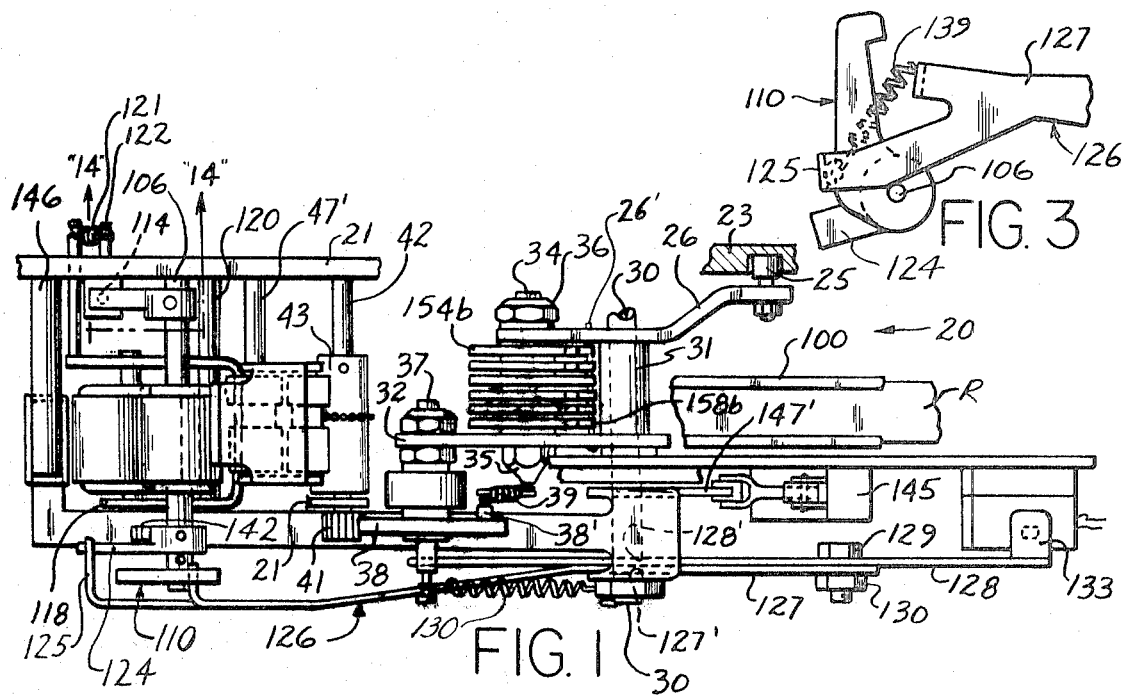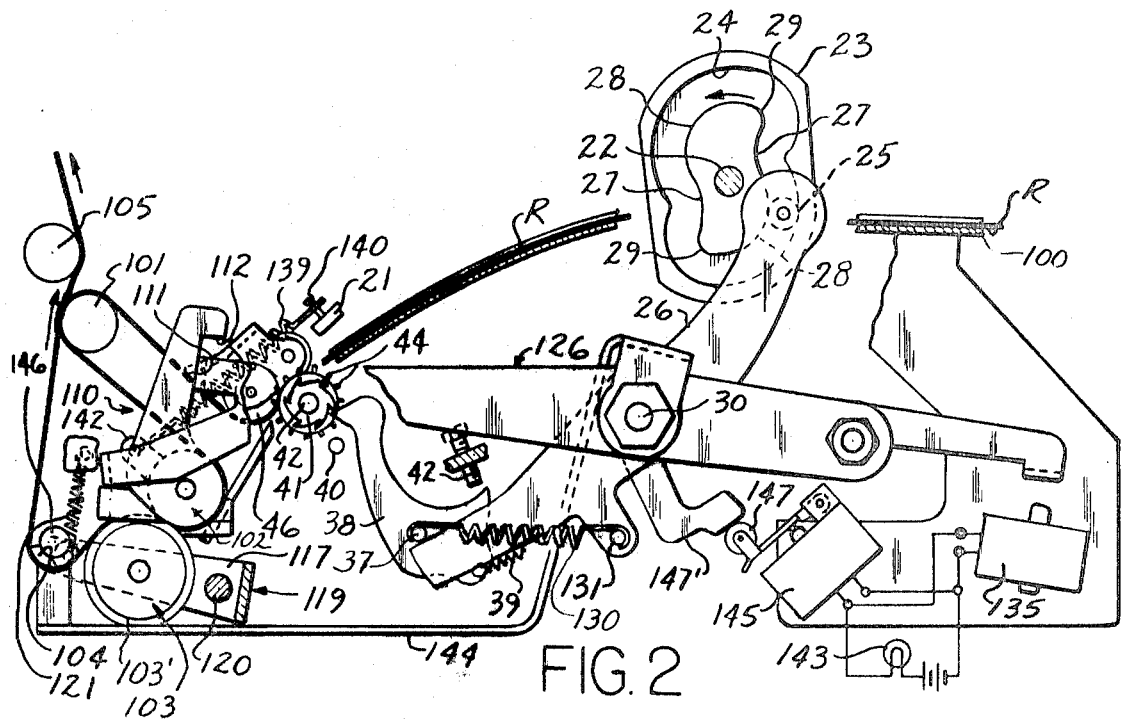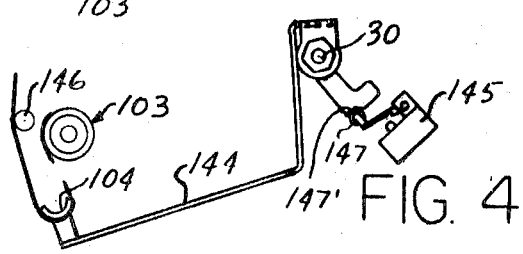

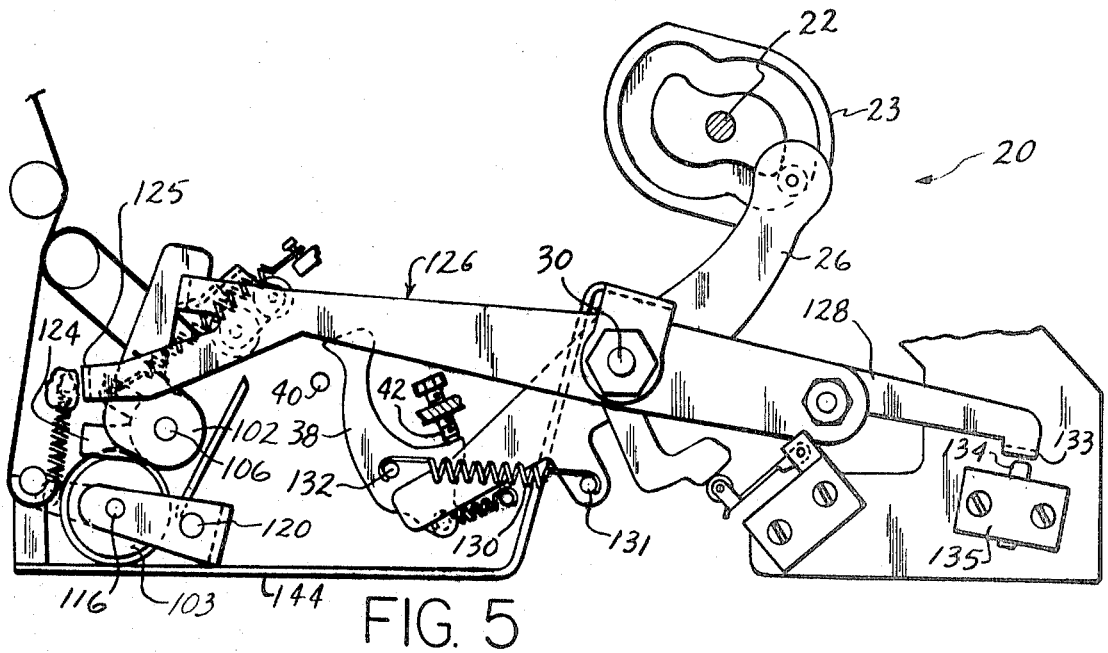
FIG. 5
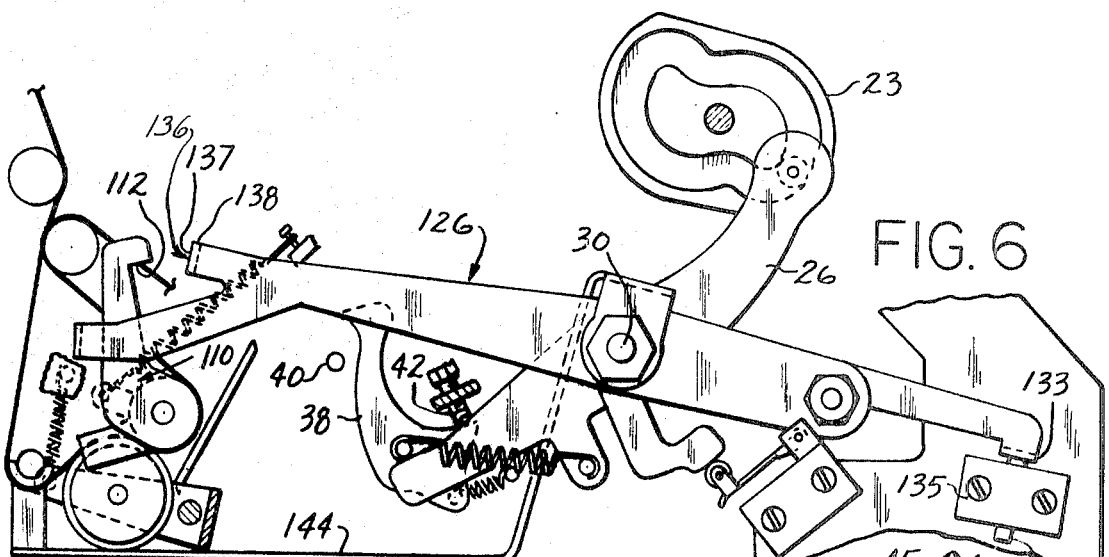
FIG. 6
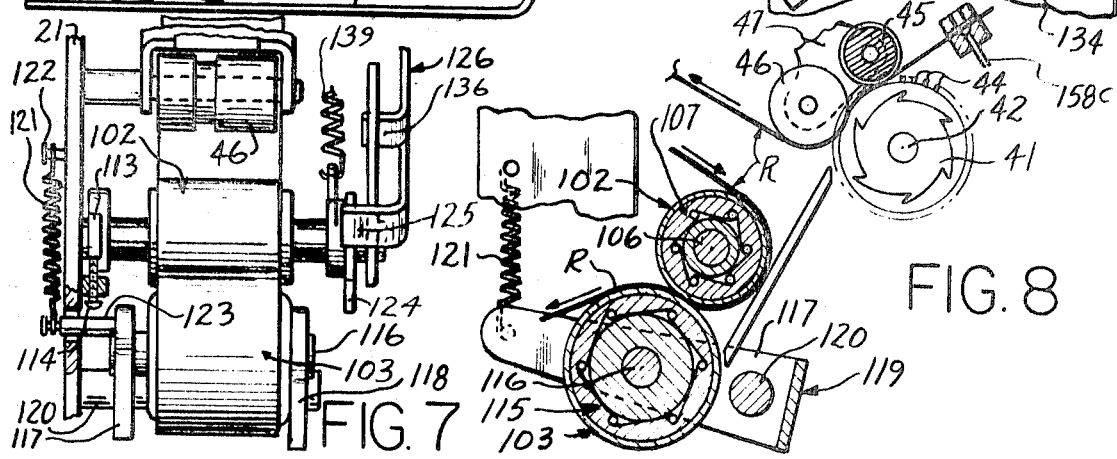
FIG. 7
FIG. 8

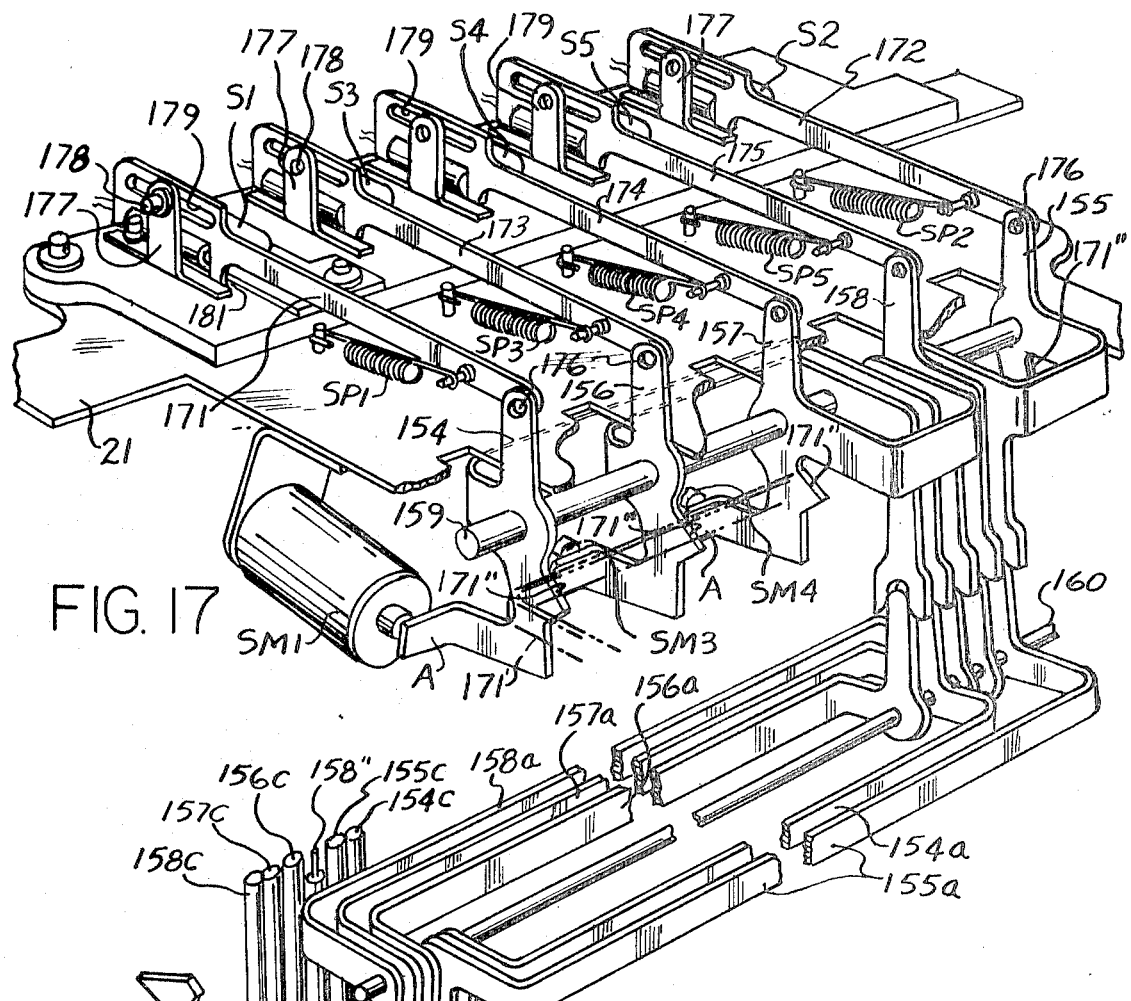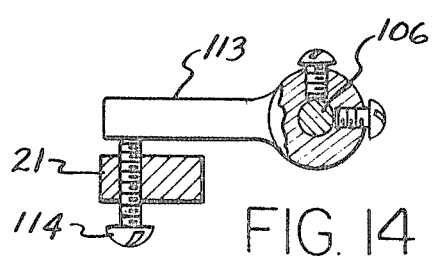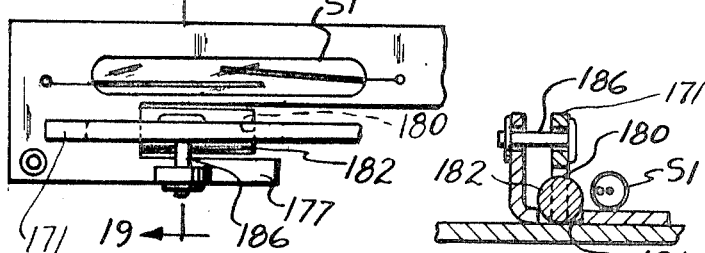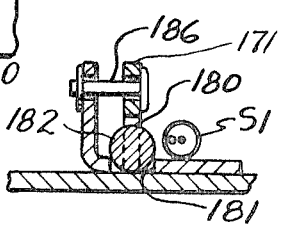

RECORD HANDLING AND RECORDING APPARATUS

FIELD OF THE INVENTION

This invention pertains to the art of alarms related to data and record handling.

SUMMARY

The purpose of invention is to indicate creation of an alarm condition whenever the record-feeding mechanism operates but fails to feed the record mdium, whenever slackness exists in the record medium, whenever the supply of the record medium is exhausted, or whenever there is a lack of comparison between an incoming signal and the signal which was actually received in response to that incoming signal.

With respect to the record motion detection aspect of the invention, a stop is moved from an ineffective position to an effective position each time the record is advanced, and conversely the stop remains in the ineffective position in the absence of record movement. Each time the record-feeding mechanism operates it urges an actuator along a path. When the stop is in its effective position, it is in the path of the movement of the actuator; thus, the actuator is blocked or restrained in its movement from effecting operation of an alarm. If, however, the stop remains in its ineffective position, the movement of the actuator is not restrained when the feeding mechanism operates, and consequently the actuator effects operation of the alarm. A one-way clutch enables the stop to move to the effective position each time the record is fed and enables the stop to be reset to the ineffective position following the completion of each cycle of operation of the feeding mechanism. A roll which engages the record medium downstream of the feeding mechanism exerts tension on the record medium. This tension is relieved when the record medium is fed, and is reapplied as soon as the stop, which is coupled to the roll through the one-way clutch, is reset. By this arrangement, the need for applying tension to the record medium downstream of the roll is obviated. However, any slack-tape condition which exists downstream of the roll can be sensed to indicate an alarm condition. Also, the out-of-tape condition is sensed by the same means which senses the slack-tape condition.

The incoming parallel data bit code signal is used to operate selector magnets equal in number to the number of data bits in the signal. The energization of selector magnets in accordance with the incoming signal causes the signal to be mechanically stored. The stored signal is used to generate an output signal which is compared with that incoming code signal. During signal storage, interposers forming part of the recorder are selectively set into either one of two positions so that recording is effected in accordance with the settings of the interposers. More particularly, the drive means serves to effect advance of the record medium and also to effect punching during each cycle of operation. The data bits forming part of the incoming signal are represented by current pulses which energize the selector magnets with holding current. Initially the armatures associated with the selector magnets are urged against the respective selector magnets. Each of these armatures is urged away from its respective selector magnet by a spring. Accordingly, only those selector magnets which are energized with holding current will overcome this urging force while the remaining armatures will be pulled away from the respective selector magnets. Each armature controls a reed switch which can generate either a current or a noncurrent data bit depending on the position of the respective armature. As the position of the armature directly determines the position of the respective interposer the generated signal will also correspond to the data which is recorded on the record medium. Lack of comparison between the incoming signal and the generated signal will cause indication of an alarm condition.

Other features, objects, and advantages will be evident from the detailed description and the accompanying illustrative drawings.

BRIEF DESCRIPTION OF THE DRAWINGS

FIG. 1 is a top plan view showing a fragmentary portion of a recorder, and an alarm mechanism in accordance with the invention;

FIG. 2 is a side elevational view of the recorder and alarm mechanism shown in FIG. 1, showing a stop member in its effective position;

FIG. 3 is a fragmentary view showing the stop member and an actuator in their initial positions;

FIG. 4 is a fragmentary view showing that portion of the alarm which senses either a slack-tape condition or an exhausted or out-of-tape condition;

FIG. 5 is a side elevational view similar to FIG. 2, but showing how the stop prevents an actuator from operating the alarm;

FIG. 6 is a side elevational view in which the stop is shown in its ineffective position, with the actuator having moved to a position in which it operates the alarm;

FIG. 7 is an elevational view as seen from the left side of FIG. 6;

FIG. 8 is a sectional view depicting fragmentary portions of the recording and feeding mechanism, and the one-way clutches and rolls which control the stop;

FIG. 14 shows adjusting means by which pivotal movement of the stop member is limited on its return or reset stroke, and is a view taken along line 14—14 of FIG. 1;

FIG. 17 is a perspective view showing the relationship of the selector magnets, interposers, interconnecting links and reed switches;

FIG. 18 is a top plan view showing one of the reed switches and one of the operating links and the permanent magnet which it carries; and FIG. 19 is a sectional view taken along line 19—19 of FIG. 18.

DESCRIPTION OF THE PREFERRED EMBODIMENT

Figure 9:
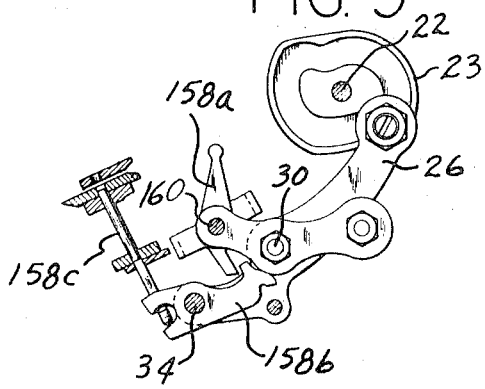
FIG. 9 is a side elevational view showing an interposer of the recording mechanism in an ineffective position.

A typical recorder, specifically a printer and perforator, to which the invention is applicable is disclosed in U.S. Pat. No. 3,014,095 to E. F. Kleinschmidt et al. The recorder disclosed in that patent effects recording by printing on, as well as by perforating, a tape. In the patent selection is accomplished with a single selector magnet, whereas in the present application a separate selector magnet is used for each bit of the incoming parallel data bit code signal. In other respects the recorder disclosed in the patent is generally the same as in the present application, and accordingly reference may be had to it for additional details.

A fragmentary portion of a recorder is generally indicated at 20. The recorder 20 includes a frame 21 in which a drive shaft 22 is rotatably mounted. Rotation of the drive shaft 22 is effected by a half-revolution clutch (not shown) which causes the drive shaft 22 to rotate through 180° each time it is engaged. A cam 23, having a closed cam track 24, is secured to the drive shaft 22. A roller 25 carried by an operating arm 26 is captive in the cam track 24. The cam 23 is a two-lobed cam, having two diametrically opposed low points 27 and two diametrically opposed high points 28 joined by respective gradually rising portions 29. As the shaft 22 starts to make one-half revolution, the roller 25 leaves the one low point 27, rides on the rising portion 29 to drive the arm 26 clockwise (FIG. 2) from its initial position, reaches the one high point 28, rolls off that high point 28, and comes to rest at the other low point 27. As the roller 25 moves from the high point 28 directly to the low point 27 the arm 26 is driven counterclockwise (FIG. 2) to its initial position.

The operating arm 26 is pivotally mounted about a pivot 30. The pivot 30 is fixed to the frame 21, however, its position can be adjusted relative to the frame 21. Spaced forwardly and rigidly fastened to the arm 26 by a sleeve 31 is an auxiliary arm 32. Punch operating levers 154b through 158b are pivotally mounted on a post or pivot 34 which extends through the arms 26 and 32. The post 34 has a head 35 at one end and a nut 36 at the other end. The arm 32 carries a post 37 which pivotally mounts a feed pawl 38. As the axis of the post 37 is spaced apart from the axis of the post 30, rotation of the cam 23 causes the feed pawl 38 to oscillate.

The feed pawl 38 is urged in a counterclockwise direction (FIG. 2) by a tension spring 39. The spring 39 is connected at one end to the head 35 and at the other end to the post 37. A stop 40 defines the initial or rest position of the pawl 38. When the roller 25 has moved away from the low point 27 of the cam 23, the feed pawl 38 moves generally upwardly and to the left (FIG. 2) until it engages and drives its associated ratchet wheel 41 in a counterclockwise direction. Near the end of the feeding stroke of the pawl 38, the pawl 38 engages an adjustable stop screw 42 which causes the feed pawl 38 to start rotating in a clockwise direction, causing it to loose contact with the ratchet wheel 41. When the roller 25 moves from contact with the high point 28 to the adjacent low point 27 during completion of the one-half revolution of the cam 23, the arm 26 returns the pawl 38 to its initial or rest position shown in FIG. 3.

The ratchet wheel 41 is secured to a spindle or shaft 42 which is rotatably mounted in the frame 21 as best shown in FIG. 1. Also secured to the shaft 42 is a sprocket 43. The sprocket 43 has feed pins 44 which enter the feed holes in the record medium R. Each time the cam 23 rotates through one-half revolution, the feed pawl 38 drives the ratchet wheel 41 and in turn the sprocket 43 rotates to advance the record medium R. Holddown rollers 45 and 46 rotatably mounted in a bracket 47, press the record medium R against the sprocket 43. The bracket 47 is mounted on a shaft 47'.

With particular reference to FIGS. 1 and 2, the record medium R is shown to be guided to the feed sprocket 43 via tape guide 100. The record medium R passes partly around the roller 46 and from there it passes partly around a cylindrical guide 101. From there the record medium R passes partly around a roll 102 and into the bite of the roll 102 and a pressure roll 103. The record medium R passes partly around the roll 103 and around a guide 104. From there the record medium R passes into contact with the record medium which passes partly around a guide 101, and from there the record medium R passes partly around a guide 105 unto a takeup reel (not shown).

Figure 13:
FIG. 13 is a fragmentary sectional view showing how the outer surface of one of the rolls is roughened by means of parallel flutes.

A shaft 106 is rotatably mounted in the frame 21. Received on the shaft 106 are a one-way clutch 107 having elongated rollers 108 and a roller bearing 109 at each side of the one-way clutch 107. The roll 102 includes a sleeve 102' press fitted over the clutch 107 and the bearings 109. The sleeve 102' is roughened by means of small parallel flutes or grooves 102" (FIG. 13) to facilitate gripping of the record medium R. Secured to the shaft 106 is a stop generally indicated at 110 having a pair of stop faces 111 and 112. Also secured to the shaft 106, as best shown in FIGS. 1 and 14, is a stop arm 113 which limits the counterclockwise rotation of the shaft 106 as viewed in FIG. 14. A set screw 114 received by the frame 21 can be adjusted to adjust the angle through which the shaft 106 can be rotated.

The one-way clutch 107 prevents the sleeve 102' of the roll 102 from rotating counterclockwise (FIG. 8) relative to shaft 106 and prevents the stop 110 from rotating clockwise from the position shown in FIG. 3 to the position shown in FIG. 2 unless and until the roll 102 also rotates clockwise. The one-way clutch 107 also enables the stop 110 to be pivoted from the position shown in FIG. 5 to the position shown in FIG. 3 following completion of each and every recording and tape feeding cycle.

Figure 12:
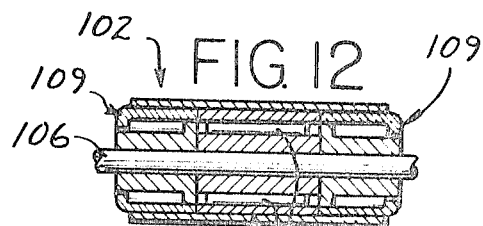
FIG. 12 is a sectional view showing one of the one-way clutches, and associated roller bearings and roll.

The roll 103 includes a sleeve 103' which is press fitted onto a one-way clutch 115 and two spaced-apart roller bearings (not shown). The sleeve 103' is identical to the sleeve 102' except that its outer surface is not roughened and that it has larger inside and outside diameters. The one-way clutch 115 and the bearings which are carried by a shaft 116 are located in the same arrangement as are the one-way clutch 107 and the bearings 109 shown in FIG. 12, however, the one-way clutch 115 is assembled onto the shaft 116 in such a way that the one-way clutch 115 prevents clockwise rotation but permits counterclockwise rotation of the roll 103 as viewed in FIG. 8. The clutch 115 prevents any backlash from occuring in the record medium R when the stop 110 is returned to its initial or ineffective position during completion of the recording and feeding cycle. The shaft 116 is secured against rotation at opposed ends in arms 117 and 118 of a generally U-shaped lever 119. The U-shaped lever 119 is pivotally mounted on a shaft 120 which extends through the arms 117 and 118. A tension spring 121 is connected at one end to a stud 122 mounted by the frame 21 and at its other end to a stud 123 carried by the arm 117. The spring 121 urges the U-shaped member 119 and the roll 103 which it carries in a clockwise direction (FIG. 8) so that the record medium R is pressed against the roll 102 at the bite of the rolls 102 and 103.

Also secured to the shaft 106 is an arm 124 by which the stop 110 can be reset. The arm 124 is in the path of an extension 125 of an actuator generally indicated at 126. The actuator 126 pivots counterclockwise about a pivot 30 at the end of the recording and tape-feeding cycle and the stop 110 is pivoted counterclockwise as the extension 125 drives the arm 124 counterclockwise. The actuator 126 includes a link 127 and the link 128. The links 127 and 128 are secured to each other by a bolt 129 and a nut 130. As the links 127 and 128 have aligned bores 127' and 128' through which the pivot 30 extends the links 127 and 128 pivot as a unit about the fixed pivot 30. A spring 130 is secured at one end to a post 131 on the link 128 and at its other end to a post 37 on which the feed pawl 38 is pivotally mounted. The spring 130 normally holds the link 128 against the post 37, however, the spring 130 permits movement of the actuator 126 to be arrested in the position shown in FIG. 5 while the feed pawl 38 continues to drive the ratchet wheel 41.

The link 128 has an extension 133 which can depress a button 134 of a switch 135. The switch 135 can be of the set-reset type in which the switch 135 remains closed until the button 134 is manually shifted from the position shown in FIG. 6 to the position shown in FIG. 5.

The link 127, in addition to having the extension 125, has an extension 136. The extension 136 has stop faces 137 and 138. The stop face 137 is cooperable with the stop face 111 on the stop 110 and the stop face 138 is cooperable with the stop face 112 on the stop 110. For example, when the stop 110 has moved from the position shown in FIG. 3 to the position shown in FIG. 2, the movement of the stop 110 is arrested when its stop face 111 strikes the stop face 137. As the cam 23 rotates to a position closer to the high point 28 the actuator 126 moves to the position shown in FIG. 5, at which the clockwise movement of the actuator 126 is arrested when its stop face 138 abuts the stop face 112, thereby preventing the extension 133 of the actuator 126 from engaging the button 134 and closing the switch 135. Continued rotation of the cam 23 causes the roller 25 to pass from the high point 28 immediately to the low point 27; this causes the arm 32, the post 37 and the pawl 38 to be pivoted counterclockwise (FIG. 5) so that the post 37 also drives the actuator 126 in a counterclockwise direction. As the actuator 126 rotates counterclockwise, its extension 125 engages the arm 124 and drives the shaft 106, the arm 113, and the stop 110 which it carries in a counterclockwise direction (FIG. 5) relative to the roll 102 until the arm 113 abuts the stop screw 114, thereby returning the stop 110 to its initial position shown in FIG. 3.

In operation, when the one-half revolution clutch (not shown) is operated, the drive shaft 22 will make one-half revolution. Initially the roller 25 is at the low point 27 of the cam 23. As the cam 23 starts to make one-half revolution the roller 25 rolls along the gradually rising portion 29 until it reaches the high point 28. Immediately after reaching the high point 28, the roller moves to the second low point 27 where it comes to rest after the completion of the one-half revolution. While the cam is rotating as indicated, the feed pawl 38 moves in a generally upward and leftward direction as viewed in FIG. 2 and the feed pawl 38 engages the ratchet wheel 41 to rotate the ratchet wheel 41 and the sprocket 43. As the feed pawl 38 continues to move it will abut a stop screw 42 which will cause the feed pawl 38 to rotate clockwise (FIG. 5), causing the feed pawl 38 to lose contact with the ratchet wheel 41. Immediately thereafter the pawl 38 is returned to its initial position shown in FIG. 3 as the roller 25 passes from the high point 28 to the low point 27. While the sprocket 43 was rotating, the record medium R was advanced to permit the roller 102, the shaft 106, the stop 110, and the arms 113 and 124 to rotate clockwise to the position shown in FIG. 2. Inasmuch as the roll 103 presses the record medium against the roll 102, the stretch of record medium between the sprocket 43 and the bite of the rolls 102 and 103 is under tension until such time as the tension of the record medium is relieved when the feed pawl 38 drives the ratchet wheel 41. This tension exists because of the one-way clutch 107 and due to the tension exerted by a tension spring 139. The spring 139 is connected at one end to a post 140 mounted by the frame 21 and at its other end to an arm 142 which is secured to the shaft 106. The spring 39 exerts torque on the shaft 106 continuously tending to rotate the shaft 106, the stop 110, and the arms 113, 124 and 142 in the clockwise direction (FIG. 2). Unless the record medium R is fed by the operation of the feed pawl 38 and the ratchet wheel 41, the frictional force created by the pressure of the roll 103 against the record medium R and in turn the pressure of the record medium against the roll 102 keeps the stop 110 in the initial position shown in FIGS. 3 and 6. During feeding movement of the sprocket 43, the roll 102 and the stop 110 pivot clockwise (FIG. 2) and the roll 103 pivots counterclockwise. As the roller 25 moves from the high point 28 to the low point 27 of the cam 23, the actuator 126 pivots counterclockwise (FIG. 2) until extension 125 engages arm 124 to drive the stop 110 counterclockwise to the position shown in FIG. 3. In FIG. 3, the arm 124 is shown to be spaced from the extension 125. This is because the extension 125 imparts angular momentum to the stop 110 and the arms 113, 124 and 142 during counterclockwise rotation of the actuator 126 so that it is not until arm 113 strikes the stop screw 114 that the pivotal movement of the stop 110 and arms 113, 124 and 142 is arrested. Should the sprocket 43 fail to feed the record medium R when the feed pawl 38 drives the ratchet wheel 41, the record medium R between the rolls 102 and 103 will not move and hence the stop 110 cannot pivot clockwise from its ineffective position shown in FIGS. 3 and 6 to its effective position shown in FIG. 2. Consequently, the stop face 138 of the actuator 126 will not abut against the stop face 112 of the stop 110. Therefore, the actuator 126 moves to the position shown in FIG. 6, so that the extension 133 operates the button 134 of the switch 135, thereby indicating an alarm condition. The alarm condition can be evidenced in a variety of ways. For example, it can complete a circuit to energize a lamp 143, it could operate a bell (not shown), or it could cause another recorder to start recording the data to effect recording in response to subsequent signals. Following such an alarm condition, return of the actuator 126, the feed pawl 138 and the stop 110 to their initial positions is completed in the same manner as described above by the time the roller 25 has come to rest at a low point 27 of the cam 23.

It is the friction between the record medium R and the roll 102 which holds the stop 110 in the position shown in FIG. 3 until the record medium moves. If the supply of record medium is exhausted, the spring 139 will always cause the stop 110 to be moved to its effective position shown, for example, in FIG. 2. Absent the record medium between the rolls 102 and 103, the stop 110 will move to the effective position shown in FIG. 2 during each recording and tape feeding cycle so that an alarm condition will not be indicated. However, when the supply of record medium is exhausted, an arm 144 pivotally mounted on the post 30 can pivot counterclockwise from the position shown in FIG. 2 to the position shown in FIG. 4 to effect closure of a switch 145 by a cam 147' to indicate an alarm condition by lighting the lamp 143.

As long as there is record medium R under sufficient tension in contact with the guide 104, the guide will be held against a stop 146 secured to the frame 21. When the supply of record medium is exhausted or when the record medium becomes too slack downstream of the rolls 102 and 103 the guide 104 will pivot away from the stop 146 under the force of gravity. A spring-urged roller 147 will move from the position shown in FIG. 2 to the position shown in FIG. 4, thereby closing the switch 145 and completing the circuit to the lamp 143 or other suitable device.

Figure 15:
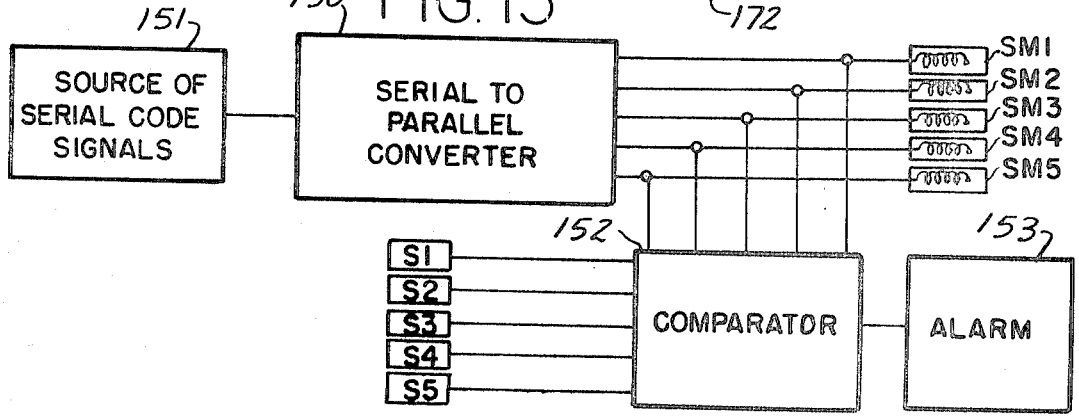
FIG. 15 is a diagrammatic view illustrating the manner in which an incoming code signal is compared with a signal generated by the recorder.

Referring to FIG. 15 there is shown a serial-to-parallel converter 150 connected to a source of serial code signals 151. The output of the serial-to-parallel converter 150 is connected to selector magnets SM1 through SM5 and to inputs to a comparator 152. Switches S1 through S5 are inputs to the comparator 152 and an alarm 153 is connected to the output of the comparator 152. Each of the five selector magnets SM1 through SM5 is cooperable with an armature A of a respective armature lever 154, 155, 156, 157 or 158. The levers 154 through 158 are pivotally mounted on a common pivot 159. The levers 154 through 158 are connected to interposers 154a, 155a, 156a, 157a and 158a which are pivotally mounted on a common shaft 160. Clockwise rotation of any individual lever 154 through 158 will cause counterclockwise rotation of the respective interposers 154a through 158a. Conversely, counterclockwise rotation of any individual lever 154 through 158 will cause clockwise rotation of the respective interposers 154a through 158a. The position of the interposers 154a through 158a determines which of the respective punch pins 154c through 158c will be operated. A punch member or pin 158" for punching the feed holes in the record medium R operates each time the cam 23 rotates through one-half revolution as its punch lever 158' has an end 161, captive about a post 26', which causes punch lever 158' to move as a unit with the associated arm 26. Thus, a feed hole will always be punched in the record medium R for each incoming code signal.

Figure 10:
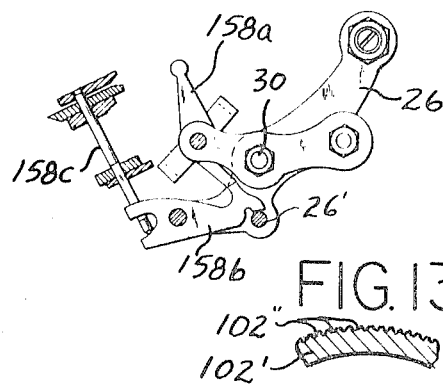
FIG. 10 is a view similar to FIG. 9, but showing the interposer in an effective position in which the recording mechanism can effect recording.
Figure 11:
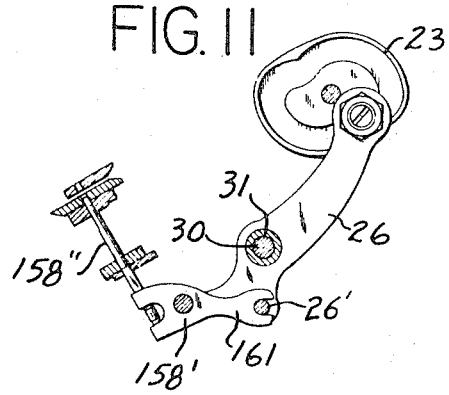
FIG. 11 is a view similar to FIGS. 9 and 10, but showing the structure by which the feed hole is punched each time the cam makes one-half revolution.
Figure 16:
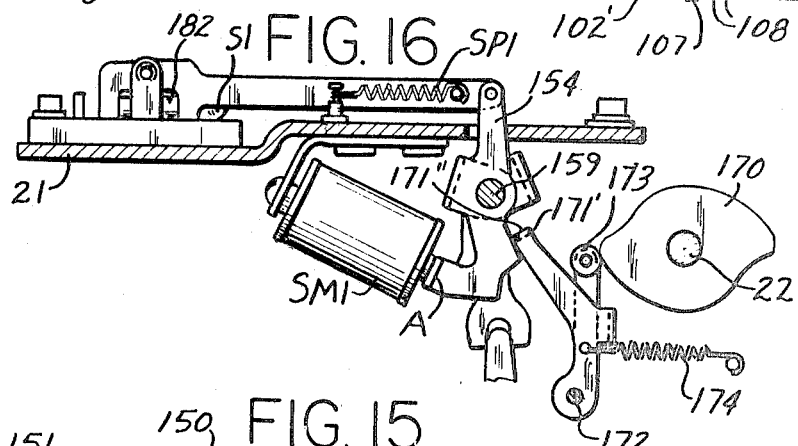
FIG. 16 is a sectional view showing a selector magnet and its associated linkage, together with a restoring cam and a universal bail.

With reference to FIG. 16, there is shown a two-lobed cam 170 secured to the drive shaft 22. A universal bail 171', pivotally mounted on a post or pivot 172, carries a follower roller 173. A tension spring 174 urges the roller 173 against the cam 170. The roller 173 is shown to be at one of the two high points of the cam 170. Each of the levers 154 though 158 is shown to have a face 171" which the bail 171 is adapted to engage. When the cam 170 is in the position shown in the FIG. 16, the universal bail 171' has moved all the levers 154 through 158 to the position in which their respective armatures A are in contact with their respective selector magnets SM1 through SM5. The selector magnets SM1 through SM5 will be energized in response to reception of an incoming code signal in accordance with the data bits of that signal. For example, assuming that the signal for the letter "R" is received in Baudot code form, the first, third and fifth bits will be space or no-current bits and the second and fourth bits will be mark or current bits. Accordingly, the selector magnets SM2 and SM4 will be energized with holding current. Initially the cam 170 is in the position shown in FIG. 16. When the one-half revolution clutch (not shown) is engaged, the cam 170 rotates counterclockwise, causing the universal bail 171' to be pivoted clockwise. As the selector magnets SM2 and SM4 are energized, relatively weak springs SP1, SP3 and SP5 pivot respective levers 154, 156 and 158 counterclockwise because respective selector magnets SM1, SM3 and SM5 are not energized with holding current. Accordingly, levers 155 and 157 are the only levers which remain in their clockwise positions in electromagnetic cooperation with selector magnets SM2 and SM4. Thus, only interposers 155a and 157a will be positioned in cooperating relationship with associated levers 155b and 157b. Consequently, only punch pins 155c and 157c will be operated during rotation of the cam 23. This is because the levers 154b, 156b, and 158b do not cooperate with the interposers 154a, 156a, and 158a so when the arm 26 pivots clockwise, the levers 154b, 156b and 158b pivot counterclockwise about post 34 relative to the arm 26 as illustrated in FIG. 9. Conversely, levers 155b and 157b do cooperate with the interposers 155a and 157a and so when the arm 26 pivots clockwise, the levers 155b and 157b pivot clockwise about pivot 30 as a unit with the arm 26; this is because the levers 155b and 157b abut against a post 26' carried by the arm 26, the same as the lever 158b is shown to abut against the post 26' in FIG. 10. By the end of the punching cycle the roller 173 is in engagement with the other high point of the cam 170, as the cam 170 was rotated through 180°. In this position, the cam 170 and the universal bail 171' assure that the armatures A of all the levers 154 through 158 are in contact with their respective selector magnets SM1 through SM5.

As indicated above, the bits in the incoming signal determine which one or ones of the selector magnets SM1 through SM5 will be energized with holding current, and consequently the armature levers 154 through 158 are either held in their clockwise positions or are pulled to their counterclockwise positions by one or more of the respective springs SP1 through SP5. Each of the springs SP1 through SP5 is connected at its one end to the frame 21 and at its other end to a respective one of the links 171 through 175. Each link 171 through 175 is connected to its respective armature lever 154 through 158 by a pin 176 which allows the armature levers to pivot relative to the respective links. Brackets 177 are mounted by the frame 21. A pin 178 mounted by each bracket 176 extends through an elongated slot 179 in the respective link. The links 171 through 175 can be shifted either in response to the restoring bail 171' or in response to the springs SP1 through SP5. Each link 171 through 175 has an inverted U-shaped cutout 180 and each bracket 177 has a slot 181 which confines a permanent magnet 182 for movement with the respective link. When the magnets 182 are in the position shown in FIG. 17, the respective reed switches S1 through S5 are open. When one or more of the selector magnets SM1 through SM5 are energized, the respective link or links 171 through 175 are moved to the right as viewed in FIG. 17 and the respective switch or switches S1 through S5 are closed by the respective permanent magnet or magnets 182. Accordingly, the reed switches S1 through S5 generate a signal which corresponds to the positions of the respective armature levers 154 through 158. As the positions of the armature levers determines the positions of the interposers 154a through 158a, which in turn controls the levers 154b through 158b and the respective punch pins 154c through 158c, the switches S1 through S5 will generate a parallel bit signal and transmit to the comparator 152 a parallel bit signal which should correspond to the parallel bit signal supplied to the selector magnets SM1 through SM5 by the serial-to-parallel converter 150. The comparator 152 determines whether or not comparison exists and if it does not exist the alarm 153 will be operated.

We claim:

1. For a recorder: means for feeding a record medium, a pair of roll means receiving the record medium in their bite, stop means effective when the record medium is fed and ineffective when the record medium is not fed, a one-way clutch coupling said stop means and one of said roll means, alarm means, and means operable each time said feeding means is operated and cooperable with said stop means (a) for preventing operation of said alarm means when said stop means is effective and (b) for causing operation of said alarm means when said stop means is ineffective.

2. The invention as defined in claim 1, including a one-way clutch mounting said other roll means for one-way movement.

3. The invention as defined in claim 1, said means operable each time said feeding means is operated including means for resetting said stop means.

4. For a recorder: alarm means; drive means; means operable by said drive means for feeding a record medium; stop means, movable from an ineffective position to an effective position in response to movement of the record medium and immovable from the ineffective position to the effective position in response to lack of movement of the record medium; and control means operable by said drive means for selectively operating said alarm means, said control means including means engageable with said stop means in its effective position for preventing operation of said alarm means and for operating said alarm means when said stop means is in its ineffective position, a roll engageable with the record medium, and a one-way clutch interconnecting said roll and said stop means to prevent movement of said stop means from its ineffective position to its effective position unless and until said feeding means feeds the record medium.

5. For a recorder: means for feeding a record medium; alarm means; drive means for said feeding means; and control means, effective during each and every operation of said feeding means and responsive to said drive means and including a one-way clutch, for actuating said alarm means when said feeding means is operated without resultant movement of the record medium, said control means further including a pivotally mounted stop, a roll engageable with the record stop and said roll, an actuator operable each time said feed means operates, and stop means being pivotal from a first position to a second position to prevent said actuator from operating said alarm means when the record medium is moved in response to operation of said feeding means, and said stop means being prevented from pivoting from the first position to the second position when the record medium does not move in response to the operation of the feeding means so that said actuator is free to operate said alarm means.

6. An alarm control for a record-feeding mechanism comprising a record-feeding means for feeding a record in a given direction; record-engaging means movably mounted downstream from said record-feeding means in said given direction and engageable with said record; biasing means coupled to the record engaging means in a sense to move the record-engaging means to cause movement of the record in said given direction, said biasing means moving said record-engaging means when the record is moved in said given direction by said record-feeding means; alarm means; and a control means for controlling operation of the alarm means, said control means including a control element coupled to the record-engaging means and movable from a normal position to a displaced position by the movement of the record-engaging means when the record-feeding means feeds the record in said given direction, said control element being moved to said normal position independent of movement of the record-engaging means incident to each operation of said record-feeding means, and means controlled by the position of the control element for operating the alarm means when the control element is in its normal position following operation of the record feeding means and for preventing operation of the alarm means when the control element has been moved to its displaced position at the end of an operation of the record-feeding means.

7. The invention as defined in claim 6, including additional control means disposed downstream of said control means for operating said alarm means either when the record medium becomes too slack or in the absence of record medium, said additional control means including a stop, a sensing lever including a guide, the record medium being engageable with the guide so that the tension of the record medium urges the guide into abutment with said stop, but in the event the tension becomes insufficient resulting in slackness or in the absence of record medium, said guide will move away from said stop so that said sensing member effects actuation of said alarm means.

* * * * *